United States Patent [19]

Masuda et al.

[11] Patent Number: 4,926,653

[45] Date of Patent: May 22, 1990

[54] MULTI-ROOM TYPE AIR-CONDITIONING EQUIPMENT

[75] Inventors: Masaaki Masuda, Nara; Masanori Kotani, Yamatokooriyama; Katsuhiro Wakahara, Nara; Shuichi Sakata, Habikino, all of Japan

[73] Assignee: Sharp Kabushiki Kaisha, Osaka, Japan

[21] Appl. No.: 367,141

[22] Filed: Jun. 16, 1989

[30] Foreign Application Priority Data

| | | |
|---|---|---|
| Jun. 17, 1988 [JP] | Japan | 63-151001 |
| Apr. 10, 1989 [JP] | Japan | 64-91064 |
| Jun. 14, 1989 [JP] | Japan | 64-152618 |

[51] Int. Cl.$^5$ .................................. F25B 41/04
[52] U.S. Cl. .................................. 62/204; 62/223; 62/228.4
[58] Field of Search ............... 62/229.4, 204, 223, 62/226; 236/75; 165/22; 364/510

[56] References Cited

U.S. PATENT DOCUMENTS

| | | | |
|---|---|---|---|
| 4,720,982 | 1/1988 | Shimizu et al. | 62/204 |
| 4,766,735 | 8/1988 | Gotou | 62/204 X |
| 4,812,997 | 3/1989 | Okochi et al. | 165/22 X |

Primary Examiner—William E. Wayner

[57] ABSTRACT

A multi-room type air-conditioner includes one outdoor apparatus and two or more indoor apparatuses which are respectively connected to the outdoor apparatus through respective electric expansion valves. The number of the indoor apparatuses to be connected is detected by a connection number detecting device, the closing degrees of the electric expansion valves are determined by the ratio of the loads of the respective indoor apparatuses and the frequency of the compressor is determined by a predetermined algorithmic expression of a relation between the loads of the respective indoor apparatuses which includes the rated capacities of the respective indoor apparatuses. Thereby, the air-conditioning operations for heating and cooling desired areas are optimally performed.

5 Claims, 9 Drawing Sheets

FIG. 10
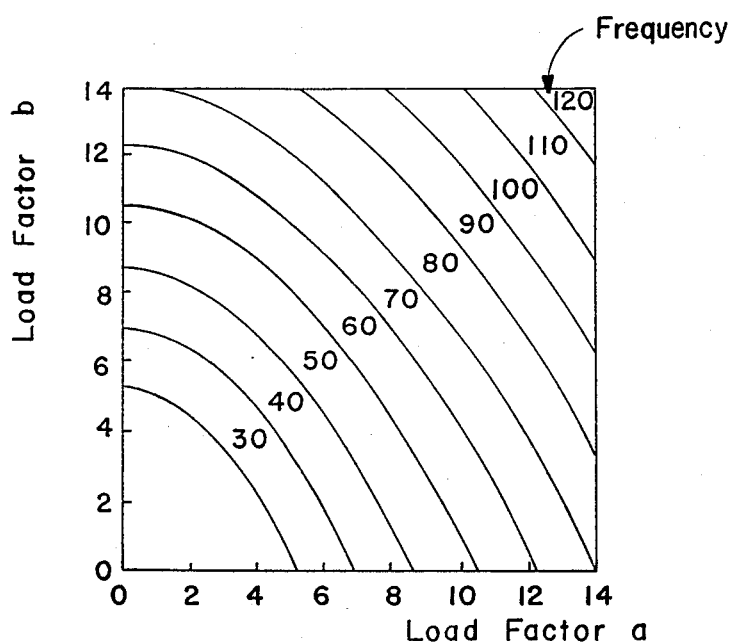
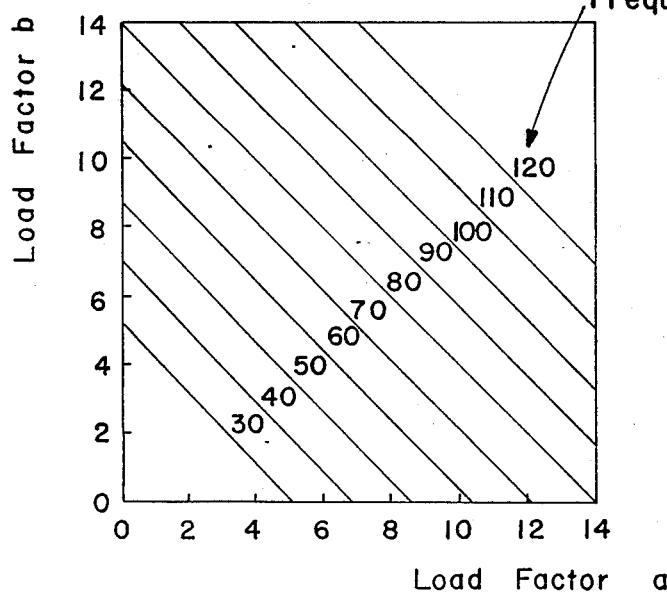
FIG. 11

MULTI-ROOM TYPE AIR-CONDITIONING EQUIPMENT

BACKGROUND OF THE INVENTION

1. Field of the Invention

The present invention relates to an air-conditioning apparatus in which the quantity of refrigerant flow is controlled by electric expansion valves that are provided in a refrigerating cycle arrangement driven by an inverter compressor. In particular the present invention relates to a multi-room type air-conditioning apparatus having one outdoor apparatus and two or more indoor apparatuses with different capacities respectively that are connected to the outdoor apparatus.

2. Description of the Related Art

In a conventional multi-room type air-conditioning apparatus with two indoor apparatuses connected to one outdoor apparatus, there are provided expansion valves respectively corresponding to the indoor apparatuses. The expansion valves mentioned above are controlled with respect to the degree that the refrigerant obtained by the corresponding heat exchangers overheat which are respectively provided in the indoor apparatuses.

FIG. 1 shows the schematic constitution of a conventional two-room type air-conditioner. In FIG. 1, noted line arrow marks denote the flow of the refrigerant when the air-conditioner is driven for air-cooling operations and solid line arrow marks denote the flow of the refrigerant when the air-conditioner is driven for air-heating operations. That is to say, when the air-conditioner is driven for air-cooling, the refrigerant vapor compressed by a compressor 1 is fed to an outdoor heat exchanger 3 through a four-way valve 2 and the vapor is condensed and liquefied. The liquefied refrigerant is fed to a receiver tank 4 and stored therein. Subsequently, the pressure of the refrigerant fluid is reduced through electric expansion valves 6a and 6b respectively connected to the indoor apparatus A and B. The decompressed refrigerant is fed to the indoor heat exchangers 7 and 8 respectively in a state of decompressed vapor. The decompressed vapor in the heat exchangers 7 and 8 returns to the compressor 1 through a branch pipe 18 and through the four-way valve 2. In this cooling operation, the opening/closing degree of the electric valves 6a and 6b are respectively controlled by control signals g and h that are generated by an expansion valve controller (see FIG. 2) in such a manner that the temperature differences (TS-TA), (TS-TB) between the temperatures (TA) and (TB) are made constant. The temperatures (TA) and (TB) are detected by temperature sensors 16a and 16b attached to the exhaust pipes of the respective expansion valves 6a and 6b and the temperature (TS) is detected by a temperature sensor 9 attached to an inhalation pipe of the compressor 1.

When the air-conditioner is driven for air-heating operations, the direction of the flow of the refrigerant is reversed with respect to the direction in the cooling operation and the refrigerant vapor compressed by the compressor 1 is fed to the indoor heat exchangers 7 and 8 and is liquefied. The liquefied refrigerant is fed to the receiver tank 4 and the pressure of the refrigerant is reduced through an expansion valve 5 for heating. Subsequently the decompressed refrigerant is vaporized in the outdoor heat exchanger 3 and the refrigerant vapor returns to the compressor 1. In this heating operation, the opening/closing degree of the expansion valve 5 for heating is controlled by an output signal i of the expansion valve controller (see FIG. 2) so that the temperature difference (TS-TC) between the temperature (TC) detected by a temperature sensor 17 attached to the exhaust pipe of the expansion valve 5 and the temperature (TS) detected by a temperature sensor 9 attached to an inhalation pipe of the compressor 1 is made constant.

As described above, in the cooling and heating cycles of the conventional air-conditioner, the opening and closing degree of the heating expansion valve 5 and of the electric expansion valves 6a and 6b are controlled so that the temperature difference between the temperature of the exhaust refrigerant of the expansion valves 5, 6a and 6b and the temperature of the inhalation refrigerant to the compressor 1 is made constant. Thereby, the refrigeration cycle is merely stabilized. Even though the loads of the indoor apparatuses A and B are respectively varied, but a constant total for the sum of both loads is kept, the quantities of the refrigerant fluid flowing through the respective indoor heat exchangers 7 and 8 are varied so scarcely that the capability of the air-conditioner is generally stabilized. Moreover, the quantities of the loads (TRa—TIa) and (TRb—TIb) obtained by the differences between the set room temperatures (TRa) and (TRb) and the actually detected room temperatures (TIa) and (TIb) are used merely to determine the frequency f of the output signal of the compressor 1 as shown in FIG. 2.

However the conventional control method of the expansion valve, since the determination of the output of the compressor and the stabilization of the refrigeration cycle are independently performed when the two indoor apparatuses are driven at the same time, and a constant total for the sum of the loads of the respective indoor apparatuses is kept, even though the load of one of the indoor apparatuses is small and the load of the other is large, the quantity of the refrigerant flow into the respective indoor heat exchangers are generally equally divided. Therefore the refrigerating capability of the respective apparatus may be made generally equal.

SUMMARY OF THE INVENTION

The present invention has been made considering such problems as described above. An essential object of the invention is to provide an air-conditioner with two indoor apparatuses connected to one outdoor apparatus, wherein the loads of the respective indoor apparatuses are used not only for controlling the frequency of the compressor but also for controlling the closing degree of the expansion values. Thereby, the quantity of the refrigerant flow into the respective indoor heat exchangers is so controlled for generating a suitable degree of cooling and heating effects corresponding to the loads of the respective indoor apparatuses.

Another object of the present invention is to provide an air-conditioner with two indoor apparatuses connected to one outdoor apparatus, wherein the determination of the frequency of the compressor is facilitated by representing the relation between the loads of the respective indoor apparatuses shown in the control characteristic graph with an algorithmic expression approximating an ideal characteristic graph. Whereby, a refrigerant branch point to the respective indoor apparatuses can be freely set so that the indoor apparatuses having different sizes or capacities can be connected by changing parameters.

Still another object of the present invention is to provide an air-conditioner with two or more indoor apparatuses respectively connected to one outdoor apparatus. The indoor apparatuses to be connected is detected by a connection number switching device and the closing degree of the electric expansion valves is determined by the ratio of the loads of the respective indoor apparatuses and the frequency of the compressor is determined by an algorithmic expression of a relation between the loads of the respective indoor apparatuses including the rated capacities of the respective indoor apparatuses.

The multi-room type air-conditioner of the present invention includes one outdoor apparatus and two or more indoor apparatuses which are respectively connected to the outdoor apparatus through the respective electric expansion valves. The refrigerant compressed by the compressor is condensed by the respective indoor heat exchangers or the outdoor heat exchanger and the condensed refrigerant is expanded and decompressed through the respective electric expansion valves. Subsequently the decompressed refrigerant is evaporated by the outdoor heat exchanger or the respective indoor heat exchangers and the air-conditioning operations for heating and cooling the rooms are performed. In the air-conditioner mentioned above, the closing degree of the electric expansion valves are determined according to the ratio of the loads of the respective indoor apparatus obtained by the difference between the set temperature set by a room temperature setting device provided in the respective indoor apparatuses and the actual room temperature actually detected by a room temperature detecting device.

Assuming that the load factors based on the loads of the respective two indoor apparatuses obtained by the differences between the setting tempertures set by the room temperature setting device provided in the respective indoor apparatuses and the actual room temperatures are a and b, and that the ratio of the capacity of the indoor apparatus with the load factor b to the capacity of the indoor apparatus with the load factor a is M, the frequency F of the compressor is calculated from an algorithmic expression (1) in a cooling operation and the frequency F is calculated from an algorithmic expression (2) in a heating operation, i.e., $$b = -\{M^2/(f \cdot F)\}a^2 + f \cdot F \quad (1)$$

$$b = -M \cdot a + f \cdot F \quad (2)$$

wherein f is a proportional constant, and the ratio Vb/Va of the opening/closing degree for the respective electric expansion valves is determined by the ratio b/a of the respective load factors.

The features of the present invention which are believed to be novel are particularly set forth in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3 to 8 are diagrams showing a first embodiment of a two-room type air-conditioner according to the present invention, wherein, FIG. 3 is a schematic view showing the entire constitution of a two-room type air-conditioner for the first embodiment, FIG. 4 is a schematic block diagram showing a microcontroller used in the air-conditioner of FIG. 3, FIG. 5 is a graph showing the relation between the ideal quantities of the refrigerant flow into the respective indoor apparatuses for a frequency of the compressor when the air-conditioner is under cooling operations and the corresponding closing degree of the respective expansion valves, FIG. 6 is a graph showing the relation between the closing degree of the expansion valves for the frequency of the compressor when the air-conditioner is under cooling operations and the corresponding load factors of the respective indoor apparatuses, FIG. 7 is a graph showing the relation between the ideal quantities of the refrigerant flow into the respective indoor apparatuses at a frequency of the compressor when the air-conditioner is under heating operations and the corresponding factor of the closing degree for the expansion valves, and FIG. 8 is a graph showing the relation between the factors of the closing degree of the expansion valves at a frequency of the compressor when the air-conditioner is under heating operations and the corresponding load factors of the respective indoor apparatuses.

FIGS. 9 to 11 are diagrams according to a second embodiment of the present invention, wherein FIG. 9 is a graph showing expressions of the relations between the load factor a of the indoor apparatus A and the load factor b of the indoor apparatus B, FIG. 10 is a graph showing relations between the load factor a and the load factor b with respect to various frequencies F of the compressor based on FIG. 12, and FIG. 11 is a graph showing relations between the load factor a and the load factor b with respect to various frequencies F of the compressor based on FIG. 14;

FIGS. 12 to 14 are diagrams according to a third embodiment of the present invention, wherein FIG. 12 is a schematic diagram showing the entire parts of a three-room type air-conditioning apparatus for an example of the multi-room type air-conditioning apparatus, FIG. 13 is a schematic block diagram showing a microcontroller of the air-conditioning apparatus of FIG. 12, and FIG. 14 is a graph showing the relation between the two groups of load factors for the indoor apparatuses when the three-room type air-conditioner is under cooling operations.

DETAILED DESCRIPTION OF THE PREFERRED EMBODIMENT

Figure 1:
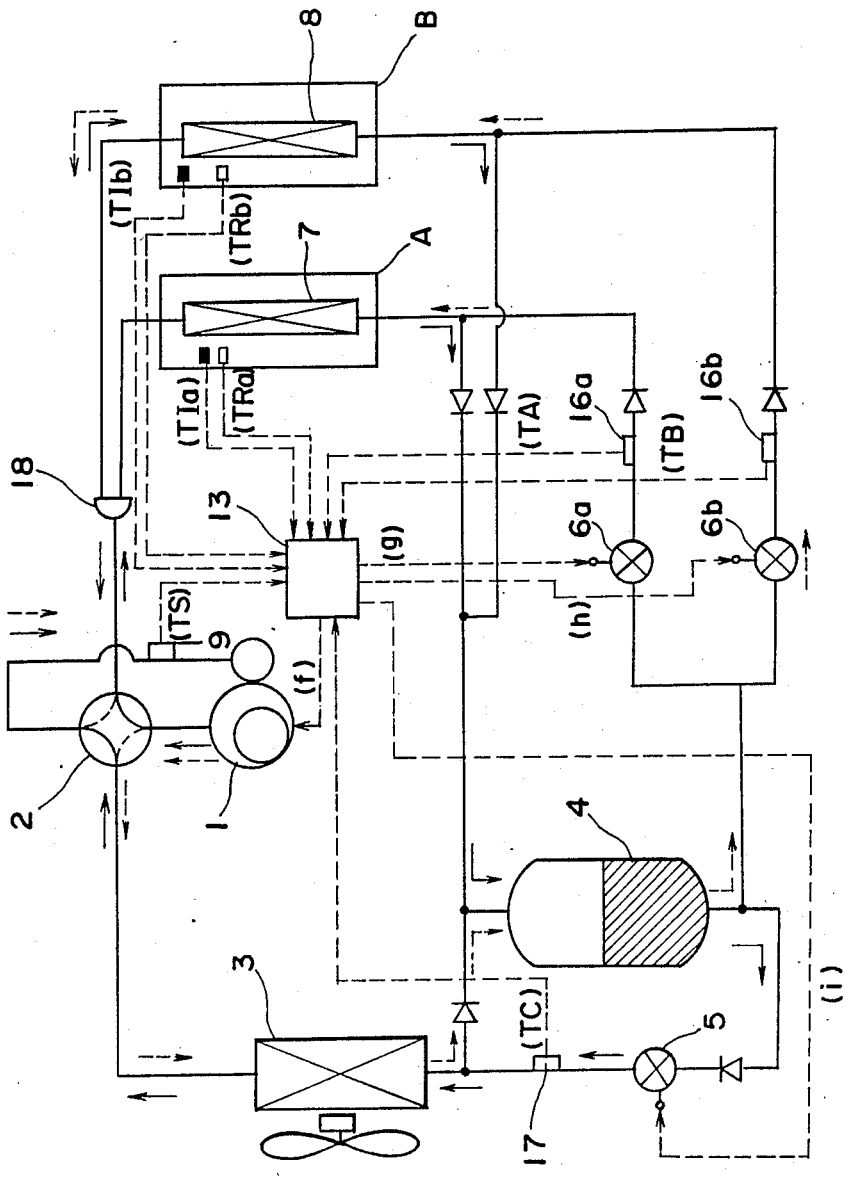
FIG. 1 is a schematic view showing the entire constitution of a conventional two-room type air-conditioner.
Figure 2:
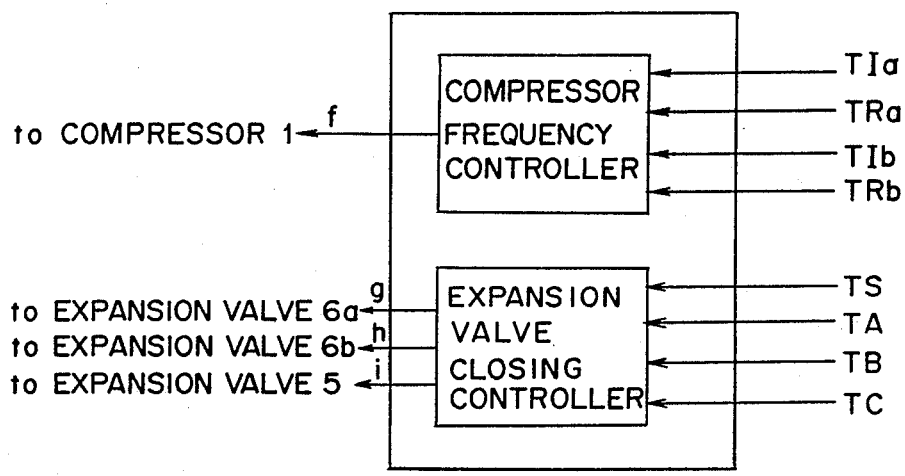
FIG. 2 is a schematic block diagram showing a microcontroller used in the conventional air-conditioner of FIG. 1.

Before the description proceeds, it is noted that since the basic structure of the air-conditioner is similar to those of the conventional air-conditioner explained with reference to FIGS. 1 and 2, like parts are designated by the same reference numerals and the explanation of the details thereof is herein omitted for brevity.

EMBODIMENT 1

Figure 3:
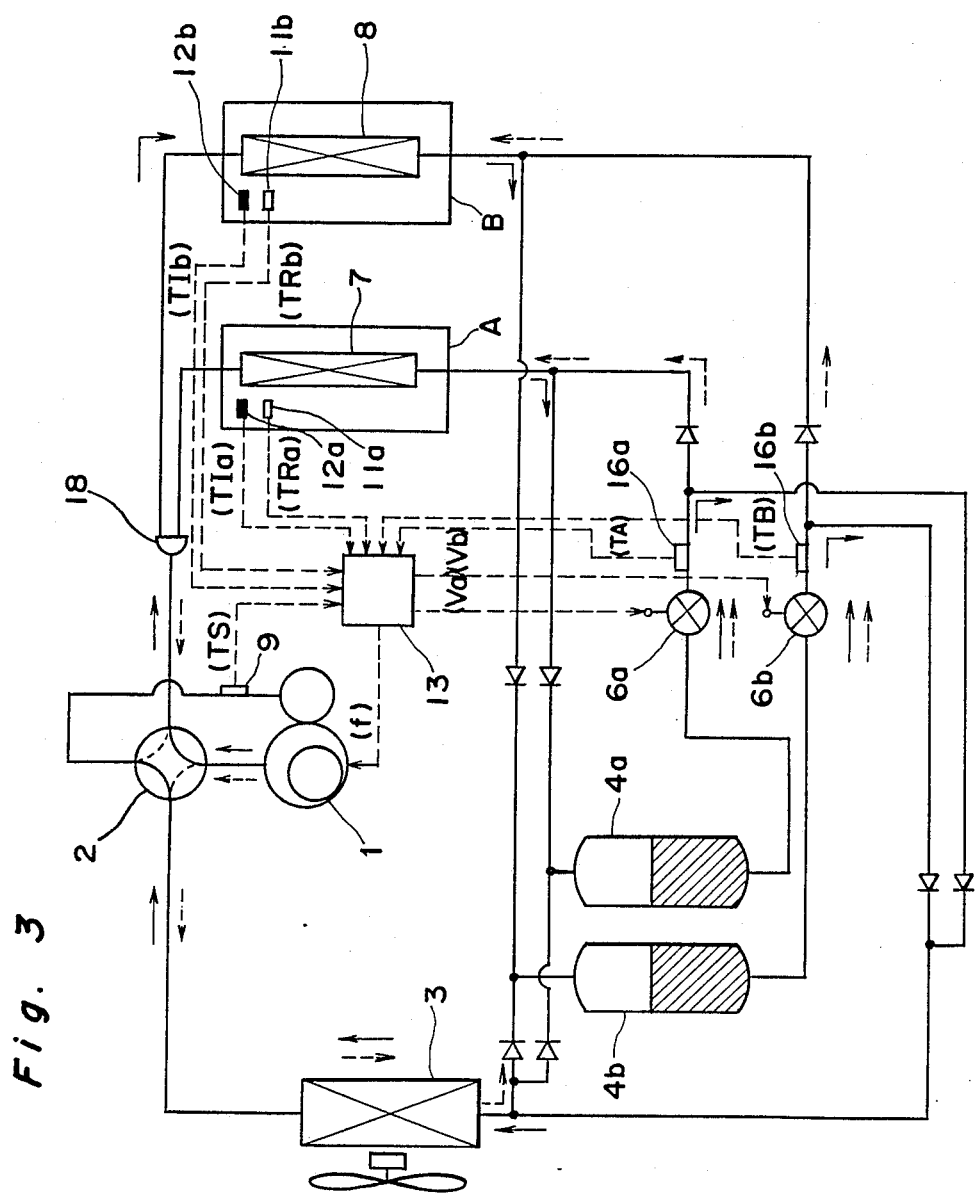

In FIG. 3, when an air-conditioner is under cooling operations, the frequency of the compressor 1 and the closing degree of the electric expansion valves 6a and 6b are determined as follows.

Figure 4:
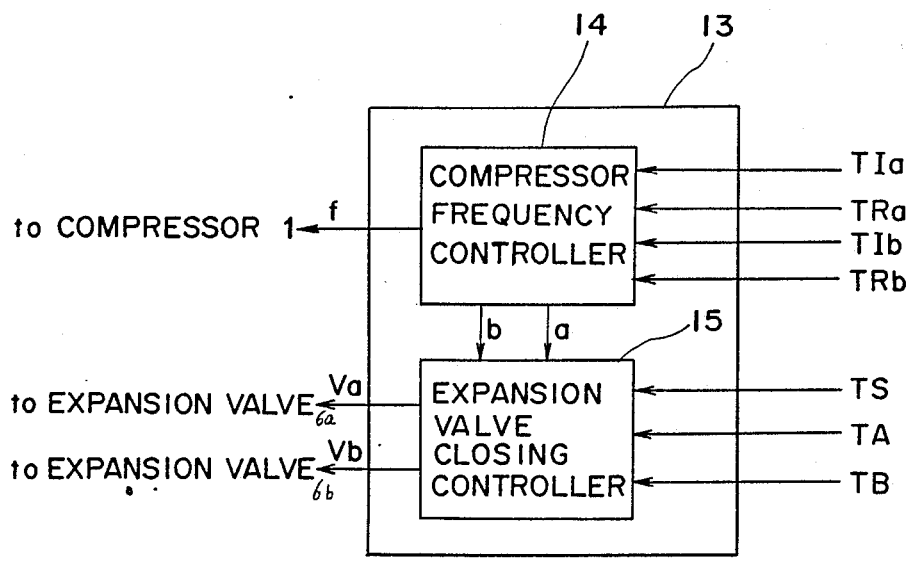

As shown in FIGS. 3 and 4, the temperatures (TIa) and (TIb) respectively set by the room temperature setting units 12a and 12b and the actual room temperatures (TRa) and (TRb) detected by the respective room temperature sensors 11a and 11b are input to a compressor frequency controller 14 in the microcontroller 13. In the expansion valve closing controller 15, temperatures (TA) and (TB) detected by the temperature sensors 16a and 16b are entered which are respectively attached to the exhaust pipes of the expansion valves 6a and 6b and a temperature (TS) detected by the temperature sensor 9 attached to the inhalation pipe of the compressor 1 is also entered in the microcontroller 13.

In the compressor frequency controller 14, with reference to the relation between the load factor corresponding to the load degrees |TRa−TIa| of the indoor apparatus A and the load factor b corresponding to the load degrees |TRb−TIb| of the indoor apparatus B as shown in Table 1, the differences (TRa−TIa) (TRb−TIb) between the setting temperatures TIa, TIb set by the room temperature setting units 12a and 12b and the actually detected room temperatures TRa and TRb in the respective rooms A and B are received as the loads of the respective indoor apparatuses A and B, and the differences therebetween are replaced by load factors a and b. As shown in Table 2, the frequency f of the compressor 1 is determined according to the sum of the respective load factors a and b.

Figure 5:
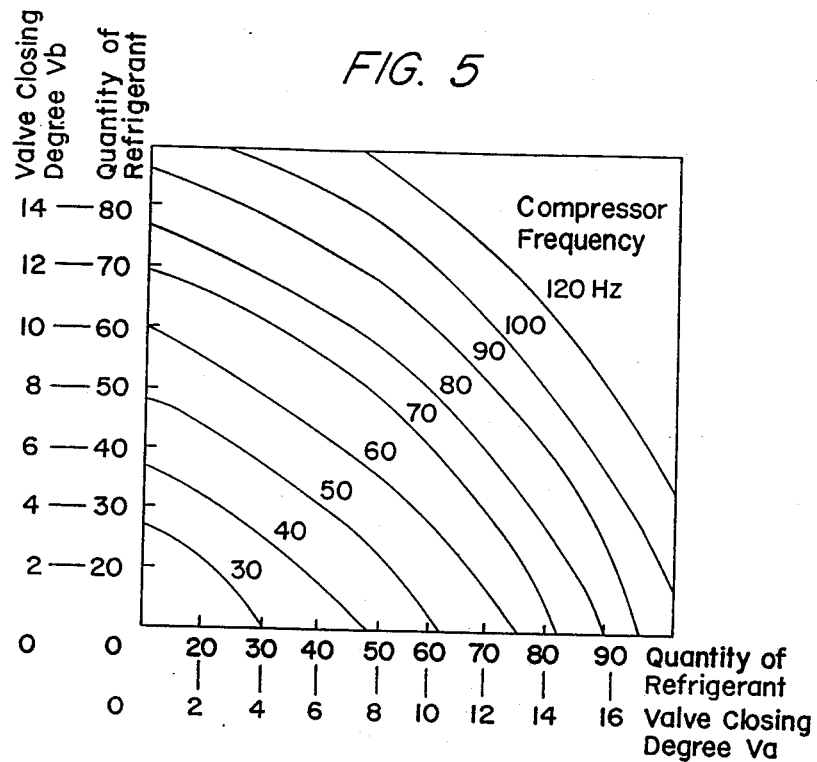
Figure 6:
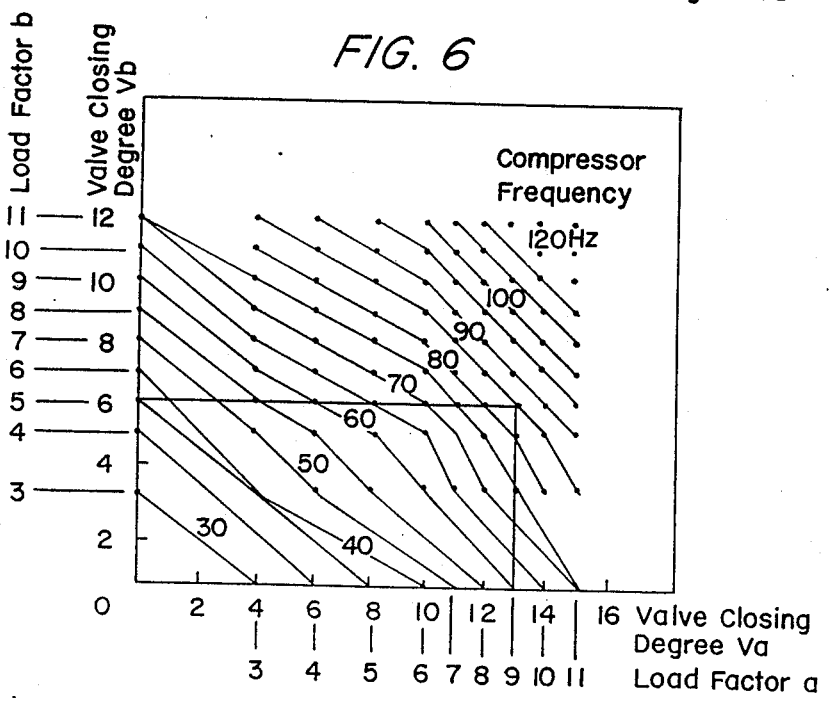

On the other hand, the expansion valve closing controller 15 receives the signals of the load factors a and b of the respective indoor apparatus A and B generated by the compressor frequency controller 14 and determines the ratio of the closing degrees Va and Vb of the respective electric expansion valves 6a and 6b. In order to determine the ratio of the closing degrees Va and Vb of the electric expansion valves 6a and 6b, the ideal specific characteristic graph for the quantity of the refrigerant flow previously obtained for maintaining the degree of the overheat constant that is obtained according to the difference between the average temperature (TA+TB)/2 of the exhaust temperatures (TA) and (TB) of the respective expansion valves 6a and 6b and the inhalation temperature (TS) is shown in FIG. 5. The relation between the load factors a and b and the expansion valve closing degrees Va and Vb are obtained on the basis of the ideal characteristic curves, whereby the control characteristic curves are determined as shown in FIG. 6. Moreover, FIG. 6 shows the control characteristic curves formed on the basis of the ideal characteristic curves shown in FIG. 5.

Next in the heating operation of the air conditioner, as shown by solid line arrow marks in FIG. 3, the refrigerant vapor compressed in the compressor 1 is fed to the branch pipe 18 through the four-way valve 2 and branched into two ways by the branch pipe 18. Subsequently, two flows of the branched refrigerant vapor are fed into the heat exchangers 7 and 8 respectively provided in the indoor apparatuses A and B so as to be condensed and liquefied. The liquefied refrigerant is fed into the receiver tanks 4a and 4b. Subsequently, the charged refrigerant is decompressed through the electric expansion valves 6a and 6b and sent to the outdoor heat exchanger 3 and is evaporated. The evaporated refrigerant returns to the compressor 1 through the four-way valve 2.

Figure 7:
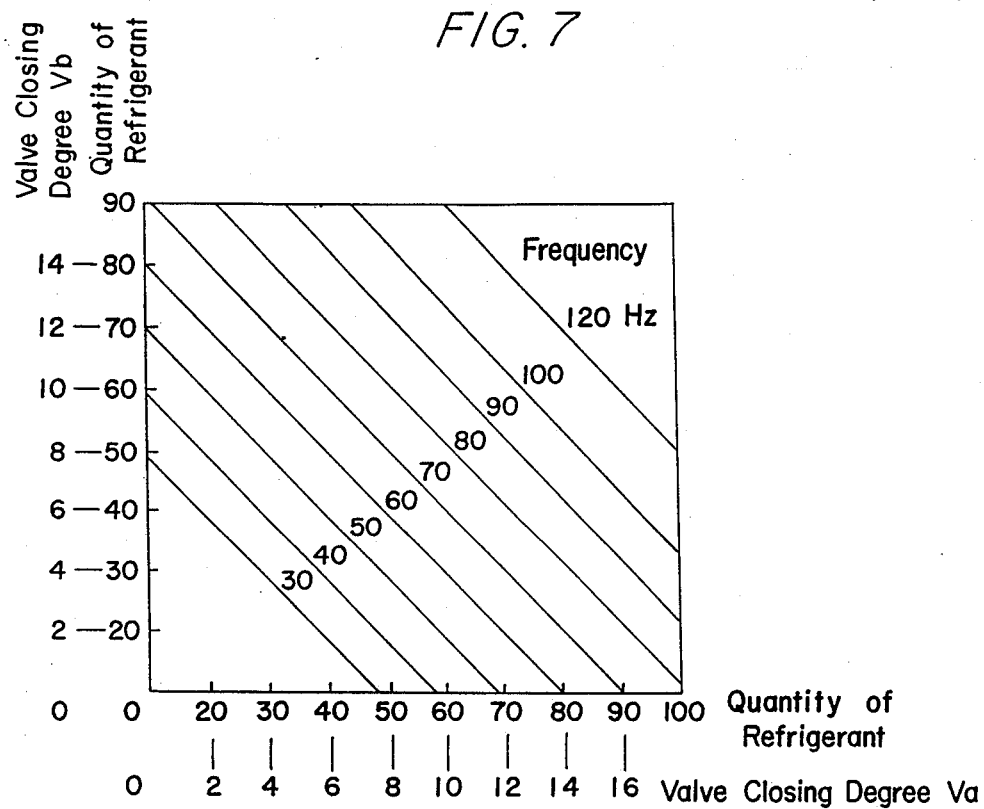
Figure 8:
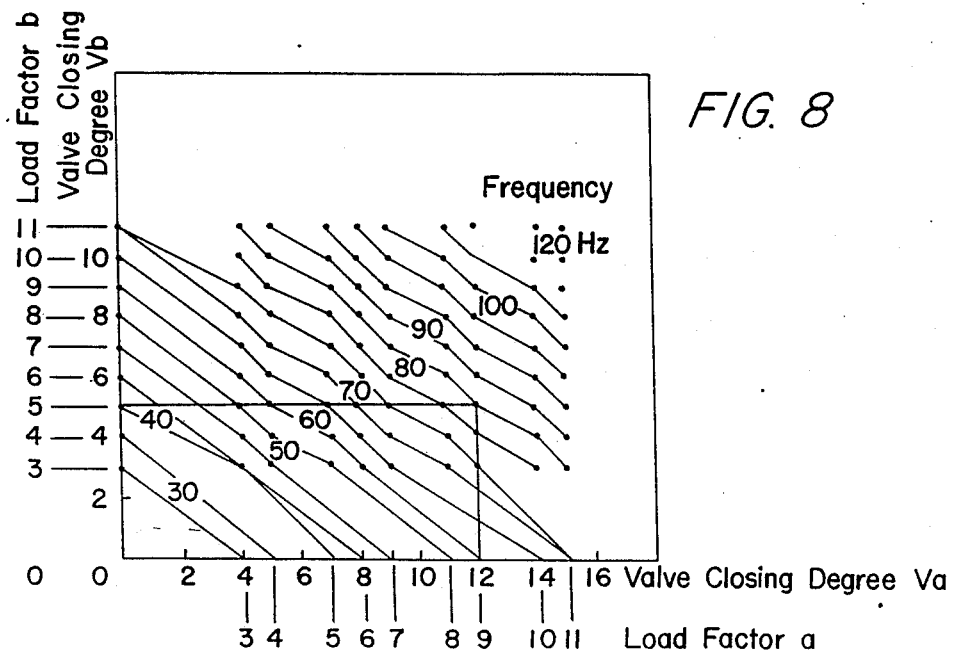

In the above mentioned heating operation, the frequency of the compressor 1 and the closing degree of the expansion valves 6a and 6b are determined in a manner similar to that in the cooling operations. However, since the direction of the flow of the refrigerant in the heating operation is reversed with respect to the direction for the cooling operation, the ideal characteristic graph for the quantity of the refrigerant flow can be represented as shown in FIG. 7. Therefore, the control characteristic curves are represented as shown in FIG. 8.

Next, concrete examples for determining the closing degrees Va and Vb of the electric expansion valves 6a and 6b are described with reference to a two-room type air-conditioning apparatus having the same characteristics as in the embodiment mentioned above.

EXAMPLE 1

In the cooling operations for the air-conditioner, in the case that the load (TRa−TIa) of the indoor apparatus A is 7±0.5 degrees and the load (TRb−TIb) of the indoor apparatus B is 3±0.5 degrees, the load factors a and b of the indoor apparatus A and B are respectively 9 and 5 with reference to Table 1. Since the total of the load factors a and b is 14 at this time, the frequency f of the compressor is determined to be 80 Hz with reference to Table 2. With reference to FIG. 6, the factor of the expansion valve closing degree Va of the indoor apparatus A is set to be 13 and the factor of the expansion valve closing degree Vb of the indoor apparatus B is set to be 6 so that the quantity of the refrigerant flow is divided on the basis of the above set degrees Va and Vb.

EXAMPLE 2

In the heating operation of the air-conditioner, in the case that the load (TRa−TIa) of the indoor apparatus A is 7±0.5 degrees and the load (TRb−TIb) of the indoor apparatus B is 3±0.5 degrees, the load factors a and b of the indoor apparatus A and B are respectively 9 and 5 with reference to Table 1. Since the total of the load factors a and b is 14 at this time, the frequency f of the compressor is determined to be 80 Hz with reference to Table 2. With reference to FIG. 8, the factor of the expansion valve closing degree Va of the indoor apparatus A is set to be 12 and the factor of the expansion valve closing degree Vb of the indoor apparatus B is set to be 5 so that the quantity of the refrigerant flow is divided on the basis of the above set degrees Va and Vb.

EMBODIMENT 2

Figure 9:
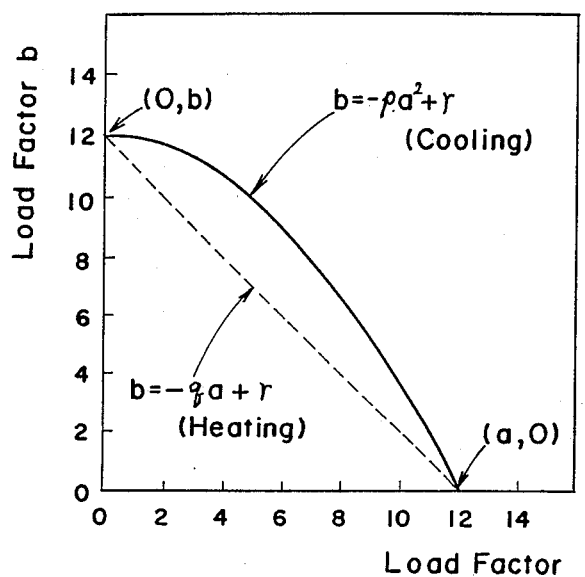

With reference to FIGS. 9 to 11, assuming that there is a constant relation between the quantity of the refrigerant flow and the load factors a and b, the ideal control characteristic graphs shown in FIGS. 5 and 7 can be represented by approximate equations with parameters of the load factors a and b for the indoor apparatuses A and B and the compressor frequency F.

That is to say, when using a quadratic equation (3) as an approximate equation, $$b = -pa^2 - qa + r \tag{3}$$

wherein p, q and r are constant, in the case of the cooling operations, an approximate equation (4) can be obtained by substituting q=0 in the equation (3) with reference to FIG. 5 as follows:

$$b = -pa^2 + r \tag{4}$$

Moreover, in the case of the heating operations, an approximate equation (5) can be obtained by substituting p=0 in the equation (3) with reference to FIG. 7 as follows:

$$b = -qa + r \tag{5}$$

The curve graphs represented by the equations (4) and (5) are represented as shown in FIG. 9. Herein, the ratio of the values b and a of the coordinates (a,0) and (0, b) which are intersections of the equations (4) and (5) with the axes X and Y, can be represented by the capacity ratio M (the ratio of the rated capacities) of the indoor apparatuses A and B as shown by an approximate equation (6).

$$M = b/a \tag{6}$$

The values of the points a and b can be represented with equations (7a) and (7b) by substituting the coordinate values (a, 0) and (0, b) respectively in the approximate equation (4) which is used in the cooling operation.

$$a = \sqrt{(r/p)} \tag{7a}$$

$$b = r \tag{7b}$$

The value of p can be represented by substituting the equations (7a) and (7b) in the equation (6) as shown by an equation (8).

$$p = M^2/r \tag{8}$$

Moreover, the values of the points a and b can be also represented as shown with equations (9a) and (9b) by substituting the coordinate values (a, 0) and (0, b) respectively in the approximate equation (5) which is used in the heating operation.

$$a = r/q \tag{9a}$$

$$b = r \tag{9b}$$

The value of q can be represented with an equation (10) by substituting the equations (9a) and (9b) in the equation (6).

$$q = M \tag{10}$$

Moreover, the value of r, which corresponds to the intersectional value at the Y axis for the graphs of the equations (4) and (5) shown in FIG. 9, is varied with the compressor frequency F as a parameter and can be represented by an equation (11), $$r = f \cdot F \tag{11}$$

wherein f represents a proportional constant.

And by substituting the equations (8) and (11) in the equation (4), an equation (1) for the cooling operations can be obtained with the load factors a and b and the compressor frequency F as the parameters.

$$b = -\{M^2/(f \cdot F)\}a^2 + f \cdot F \tag{1}$$

By graphing the equation (1) as shown in FIG. 10, an ideal control characteristic graphs can be obtained generally approximate to the ideal characteristic graphs shown in FIG. 5.

By substituting the equations (10) and (11) in the equation (5), an equation (2) for the heating operation can be obtained with the load factors a and b and the compressor frequency F as the parameters as follows.

$$b = -M \cdot a + f \cdot F \tag{2}$$

By graphing the equation (2) as shown in FIG. 11, an ideal control characteristic graph can be obtained generally approximate to the ideal characteristic graph shown in FIG. 7.

The constitution of the cooling and heating control operations using the equations (1) and (2) for cooling and heating operations respectively is similar to the first embodiment. However, in the compressor frequency controller 14, the load factors a and b are determined with reference to Table 3.

As shown in FIGS. 3 and 4, the closing degrees Va and Vb of the electric expansion valves 6a and 6b and the frequency of the compressor 1 are determined in a way similar to the first embodiment for obtaining the closing degrees Va and Vb.

EXAMPLE 3

As shown in FIG. 10, when the air-conditioner is under the cooling operations, since the load factor a equals to 14 and the load factor b equals to 14 under the condition of the compressor frequency F=80 Hz, r=14 and M=1. From the equation (11), the value of the proportional constant f becomes equal to 0.175. Accordingly, by substituting the values of F, a, b, r, M and f in the equation (1), an equation (1a) can be obtained as follows.

$$b = -\{(1/(0.175 \cdot F)\}a^2 + 0.175 \cdot F \tag{1a}$$

For example, assuming that the setting temperature TIa of the indoor apparatus A is 27° C. with the actual temperature TRa equal to 30° C. and the setting temperature TIb of the indoor apparatus B is 27° C. with the actual temperature TRb equal to 32° C., the load of the indoor apparatus A is (TRa−TIa)=3, the load of the indoor apparatus B is (TRb−TIb)=5 and the load factors a and b of the respective indoor apparatuses A and B are a=5 and b=7 with reference to Table 1. When substituting the above values of the load factors a and b in the equation (1a), the value of the compressor frequency F can be obtained as follows.

$$7 = -\{(1/(0.175 \cdot F)\}25 + 0.175 \cdot F$$

$$7F = -(25/0.175) + 0.175F^2$$

$$0 = 0.175F^2 - 7F - (25/0.175)$$

$$F = (7 \pm \sqrt{49 + 100})/0.35$$

That is, the compressor frequency F=55 Hz can be obtained.

On the other hand, the closing degrees Va and Vb of the respective expansion valves 6a and 6b are determined from the ratio of Vb/Va=7/5.

EXAMPLE 4

As shown in FIG. 11, when the air-conditioner is under the heating operations, since the load factors a and b are both equal to 14 (a=14, b=14) under the condition of the compressor frequency F=80 Hz, r=14 and M=1. By substituting the above values of F and r in the equation (11), the value of the constant f becomes equal to 0.175, thereby obtaining an equation (2a) from the equation (2) as follows.

$$b = -a + 0.175 \cdot F \tag{2a}$$

For example, in the heating operations, assuming that the setting temperature TIa of the indoor apparatus A is 21° C. with the actual temperature equal to 18° C. and the setting temperature TIb of the indoor apparatus B is 21° C. with the actual temperature TRb equal to 16° C., the load (TRa−TIa) of the indoor apparatus A becomes 3 and the load (TRb−TIb) of the indoor apparatus B becomes 5, so that the load factors a and b of the respective indoor apparatuses A and B become 5 and 7 with reference to Table 1. The compressor frequency F can be obtained by substituting the values of the load factors a and b in the equation (2a) as follows.

$$7 = -5 + 0.175 \cdot F$$

$$12 = 0.175 \cdot F$$

That is, the compressor frequency F of 69 Hz can be obtained.

On the other hand, the closing values Va and Vb of the respective expansion valves 6a and 6b are determined from the ratio of Vb/Va=7/5.

EMBODIMENT 3

Figure 12:
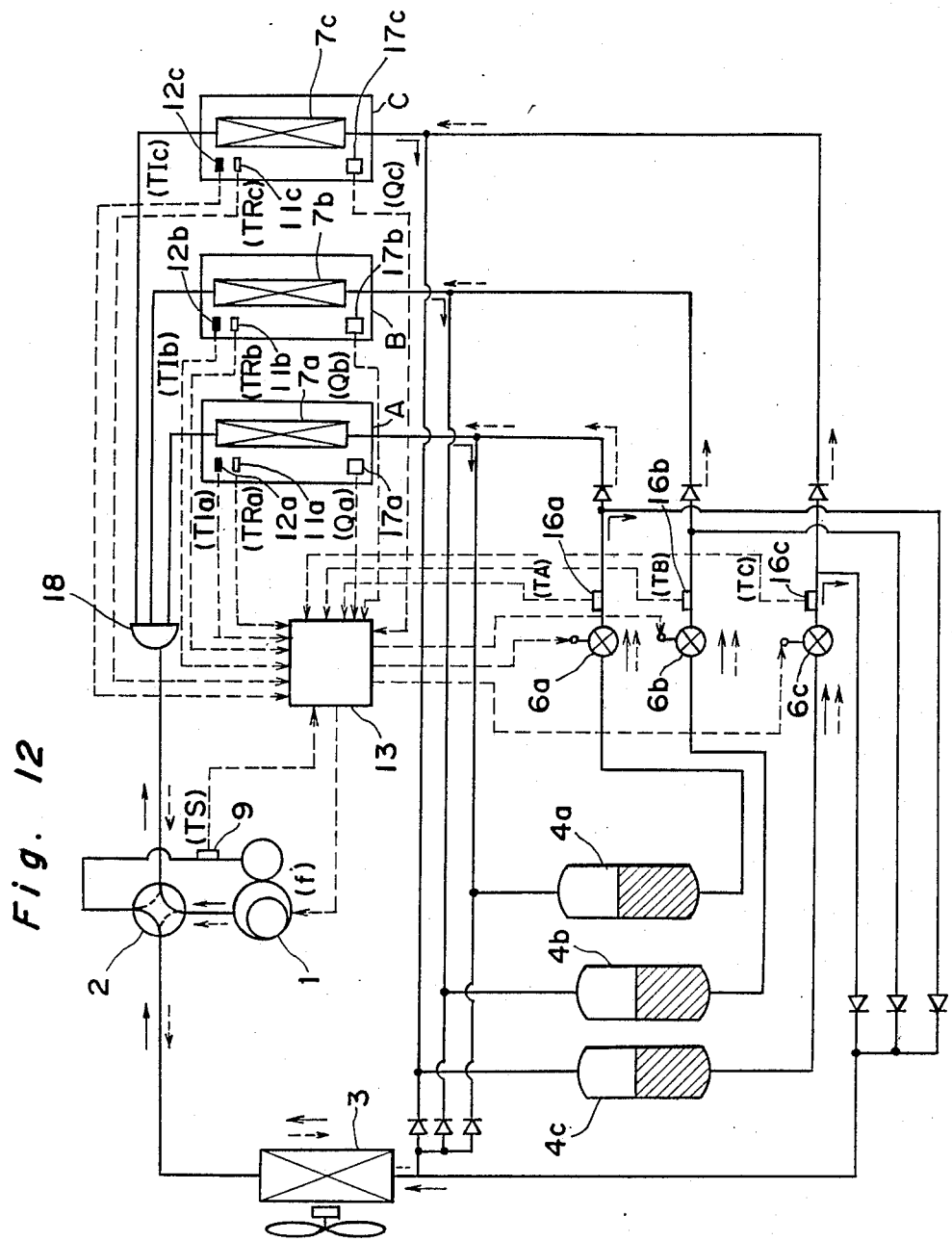

FIG. 12 is a schematic circuit diagram showing the entirety of a three-room type air-conditioning apparatus, wherein cooling operations of the air-conditions as shown by broken line arrow marks have the refrigerant vapor compressed by the compressor 1 and fed to the outdoor heat exchanger 3 through the four-way valve 2 so as to be condensed and liquefied. Then, the liquefied refrigerant is fed to three receiver tanks 4a, 4b and 4c. Subsequently, the refrigerant is decompressed through respective electric expansion valves 6a, 6b and 6c and fed to the respective indoor apparatuses A, B and C so as to be evaporated by the indoor heat exchangers 7a, 7b and 7c. The evaporated refrigerant is fed to the branch pipe 18 and then returned to the compressor 1 through the four-way valve 2. In the refrigerating cycle as mentioned above, the frequency of the compressor 1 and the closing degrees of the electric expansion valves 6a, 6b and 6c are determined as follows.

Figure 13:
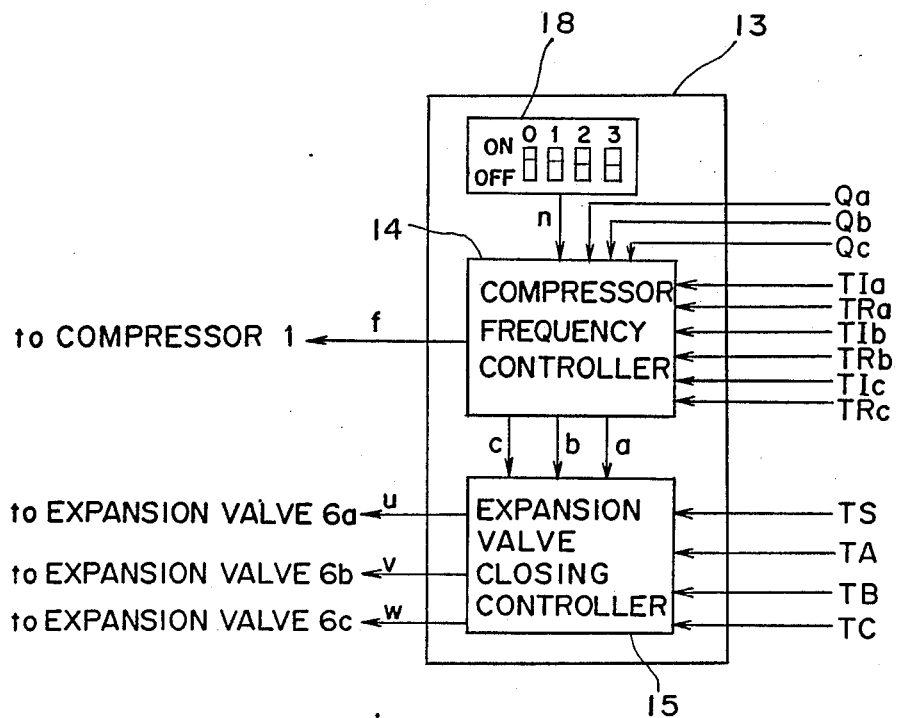

As shown FIGS. 12 and 13, in the compressor frequency controller 14 in the microcontroller 13 has entered temperatures (TIa), (TIb) and (TIc) set by the respective room temperature setting units 12a, 12b and 12c, and the actual temperatures (TRa), (TRb) and (TRc) detected by the room temperature sensors 11a, 11b and 11c and a signal (n) representing the number of the indoor apparatuses to be connected generated from a device such as an indoor apparatus connection number switching unit 18. In the expansion valve closing controller 15, are temperatures (TA), (TB) and (TC) respectively detected by temperature sensors 16a, 16b and 16c and the temperature (TS) detected by a sensor 9 attached to the inhalation pipe of the compressor 1 are entered. Further in the compressor frequency controller 14 rated capacities Qa, Qb and Qc representing the sizes of the respective indoor apparatuses A, B and C are entered.

In the compressor frequency controller 14, based on the relation shown in Table 3, the temperature differences (TRa−TIa), (TRb−TIb) and (TRc−TIc) between the set temperatures and the actual temperatures mentioned above are detected as the loads of the respective indoor apparatuses A, B and C and the ranges thereof are replaced by the load factors a, b and c, which are transmitted to the expansion valve closing controller 15 so as to determine the frequency of the compressor 1.

The frequency of the compressor is determined in a manner applying the way used in the two-room type multi air-conditioner to the way in the multi-room type air-conditioner as follows.

In the two-room type air-conditioner as described above, based on the equations (1) and (2), the frequency F of the compressor 1 is obtained as follows.

(in the cooling operations)

$$F = (b + \sqrt{b^2 + 4M^2 a^2})/2f \tag{12}$$

(in the heating operations)

$$F = (Ma + b)/f \tag{13}$$

In the case of the three-room type multi air-conditioner, assuming that the indoor load factors corresponding to the respective indoor apparatuses A, B and C are a, b and c and the rated capacities of the indoor apparatuses are $Q_a$, $Q_b$ and $Q_c$, upon substituting (a+c) for a, b for b and N ($=Q_b/(Q_a+Q_c)$) for M ($=Q_b/Q_a$) in the equation (12), the frequency F can be obtained in the processes from the equation (14) when in the cooling operations and of the equation (15) when in the heating operations.

$$F = [b + \sqrt{b^2 + 4N^2(a+c)^2}]/2f \tag{14}$$

$$F = [N(a+c) + b]/f \tag{15}$$

Generally, in a multi-room type air-conditioner including one outdoor apparatus and an n number of indoor apparatuses having different capabilities respectively connected to the outdoor apparatus, upon substituting $(a_1+a_2+\ldots+a_{n/2})$ for a, $[a_{(n/2+1)}+a_{n/2+2})+\ldots+a_n]$ for b and $L[=(Q_{(n/2+1)}+Q_{(n/2+2)}+\ldots+Q_n)/(Q_1+Q_2+\ldots+Q_{n/2})]$ for M, in the equations (12) and (13), wherein $Q_n$ denotes a rated capacity of an indoor apparatus An, the added numerals are integers of which the parts below the decimal are raised), the frequency F of the compressor can be obtained. However, the number of the indoor apparatuses to be connected is so limited as to satisfy the condition as follows.

(the sum of the capacities of the indoor apparatuses) < (the capacity of the outdoor apparatus at the maximum frequency)

EXAMPLE 5

Figure 14:
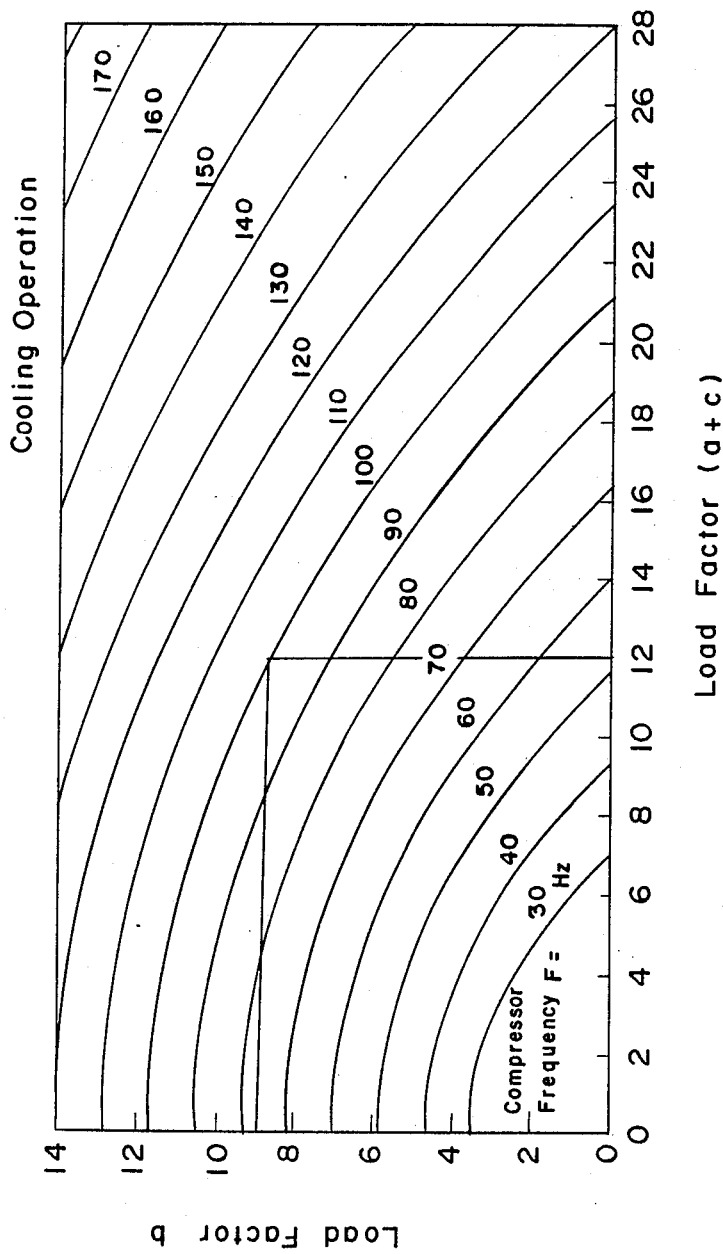

In the three-room type multi air-conditioner for example, when in the cooling operation, assuming that the setting temperatures TIa, TIb and TIc are all equal to 27° C. and the actual room temperatures TRa, TRb and TRc are respectively equal to 30° C., and 34° C., the load factors a, b and c are respectively 5, 7 and 9 with reference to Table 3. In the case when the rated capacities $Q_a$, $Q_b$ and $Q_c$ of the indoor apparatuses A, B and C are respectively 2000 kcal/h, 3000 kcal/h and 4000 kcal/h, N is equal to ½. In this case, the graphical expression for the relations between the load factor b and the load factors a+c is represented as shown in FIG. 14. The relation of the load factors of the indoor apparatuses is obtained with reference to the vertical axis of FIG. 14 so that the value of f is obtained to be f+0.117 (=14/120). Upon substituting the above values in the equation (14), the frequency F of the compressor is obtained as F=100 Hz.

EXAMPLE 6

Similarly, in the heating operation, assuming that the setting temperatures TIa, TIb and TIc are all equal to 21° C. and the actual room temperatures TRa, TRb and TRc are respectively 18° C., 16° C., and 14° C., the load factors a, b and c are respectively equal to 5, 7 and 9 with reference to Table 3, so that the frequency F of the compressor is obtained to be nearly 120 Hz by substituting the above values in the equation (15).

On the other hand, in the expansion valve closing controller 15, the signals of the load factors a, b and c are entered from the compressor frequency controller 14 and the ratio of the closing degrees u, v and w of the respective expansion valves 6a, 6b and 6c is determined with respect to the values of the load factors a, b and c. The ratio of the closing degrees u, v and w is determined so as to maintain the overheat degree obtained by the difference between the average temperature (TA+TB+TC)/3 of the exhaust temperatures TA, TB and TC of the respective expansion valves 6a, 6b and 6c and the inhalation temperature TS of the compressor 1. At this time, the ratio of the closing degrees u:v:w of the respective expansion valves 6a, 6b and 6c is maintained to be constant.

In the heating operation, as shown by the solid arrow marks in FIG. 12, the refrigerant vapor compressed by the compressor 1 is fed to the branch pipe 18 through the four-way valve 2 so as to be branched. Subsequently, the branched refrigerant is condensed and liquefied by the indoor heat exchangers 7a, 7b and 7c in the respective indoor apparatuses A, B and C and is fed to the receiver tanks 4a, 4b and 4c. Subsequently, the liquefied refrigerant is decompressed through the respective expansion valves 6a, 6b and 6c and is fed to the outdoor heat exchanger 3 so as to be evaporated and the evaporated refrigerant returns to the compressor 1 through the four-way valve 2. In this heating operation, the frequency F of the compressor 1 is determined by using the equation (15) and the closing degree of the expansion valves 6a, 6b and 6c is determined in a manner similar to that in the cooling operations.

Similarly, in the case when an n number of the indoor apparatuses $A_1$, $A_2$, ..., $A_n$ are connected to the outdoor apparatus, the expansion valve closing controller 15 receives the signals of the load factors $a_1$, $a_2$, ..., $a_n$ of the respective indoor apparatuses $A_1$ to $A_n$ and the ratios of the closing degrees $u_1$, $u_2$, ..., $u_n$ of the respective expansion valves $6a_1$, $6a_2$, ..., $6a_n$ are determined in correspondence to the values of the load factors $a_1$, $a_2$, ..., $a_n$. Also, the closing degrees $u_1$, $u_2$, ..., $u_n$ are determined so as to maintain the overheat degree constant obtained by the difference between the average temperature $(TA_1+TA_2+...+TA_n)/n$ of the exhaust temperatures $TA_1$ to $TA_n$ of the expansion valves $6a_1$ to $6a_n$ and the inhalation temperature (TS) of the compressor 1.

As described above, according to the first embodiment of the present invention, upon determining the closing degrees of the electric expansion valves corresponding to the load factors of the respective indoor apparatuses, it becomes possible to vary the air-conditioning degree more minutely so that the air-conditioning of the respective rooms can be improved. Moreover, even though the air-conditioning capabilities of the respective indoor apparatus are unbalanced due to a change of the resistances of the indoor pipe arrangement or the outdoor pipe arrangement, since the desirable quantity of the refrigerant flow corresponding to the load of the indoor apparatus can be obtained, the stable air-conditioning capability can be secured.

Moreover, according to the second embodiment of the present invention, the frequency of the compressor can be minutely controlled by using algorithmic expressions corresponding to the load factors of the indoor apparatuses without providing a memory map in a micro-program. In addition, two indoor apparatuses each having a different capacity can be easily connected only by changing the variables of the algorithmic expressions and a comfortable air-conditioning can be performed.

Moreover, according to the third embodiment, any number and any size of the indoor apparatuses can be connected to one outdoor apparatus within the range of the capacity of the outdoor apparatus so that the capabilities of the indoor apparatuses can be delivered in correspondence to the required loads of the respective indoor apparatuses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|TRa-TIa| Load (deg)
L. Factor b

| | | | | | | | | | | |
|---|---|---|---|---|---|---|---|---|---|---|
| 9 ± 0.5 | 11 | 11 | 14 | 15 | 16 | 17 | 18 | 19 | 20 | 21 | 22 |
| 8 ± 0.5 | 10 | 10 | 13 | 14 | 15 | 16 | 17 | 18 | 19 | 20 | 21 |
| 7 ± 0.5 | 9 | 9 | 12 | 13 | 14 | 15 | 16 | 17 | 18 | 19 | 20 |

TABLE 1-continued

| | | | | | | | | | | |
|---|---|---|---|---|---|---|---|---|---|---|
| 6 ± 0.5 | 8 | 8 | 11 | 12 | 13 | 14 | 15 | 16 | 17 | 18 | 19 |
| 5 ± 0.5 | 7 | 7 | 10 | 11 | 12 | 13 | 14 | 15 | 16 | 17 | 18 |
| 4 ± 0.5 | 6 | 6 | 9 | 10 | 11 | 12 | 13 | 14 | 15 | 16 | 17 |
| 3 ± 0.5 | 5 | 5 | 8 | 9 | 10 | 11 | 12 | 13 | 14 | 15 | 16 |
| 2 ± 0.5 | 4 | 4 | 7 | 8 | 9 | 10 | 11 | 12 | 13 | 14 | 15 |
| 1 ± 0.5 | 3 | 3 | 6 | 7 | 8 | 9 | 10 | 11 | 12 | 13 | 14 |
| 0 ± 0.5 | 0 | 0 | 3 | 4 | 5 | 6 | 7 | 8 | 9 | 10 | 11 |
| Room B | | 0 | 3 | 4 | 5 | 6 | 7 | 8 | 9 | 10 | 11 |
| Room A | | 0 + 0.5 | 1 ± 0.5 | 2 ± 0.5 | 3 ± 0.5 | 4 ± 0.5 | 5 ± 0.5 | 6 ± 0.5 | 7 ± 0.5 | 8 ± 0.5 | 9 ± 0.5 |

|TRa-TIa|Load (deg)
L. Factor$^a$

TABLE 2

| Load Factors a + b | 0 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|
| COMP. Freq. f (Hz) | 0 | | 30 | | 40 | | 50 | | 60 | | 70 | | 80 | | 90 | | 100 | | | | 120 |

TABLE 3

| Load Factor a, b | 0 | 3 | 4 | 5 | 6 | 7 | 8 | 9 | 10 | 11 | 12 | 13 | 14 |
|---|---|---|---|---|---|---|---|---|---|---|---|---|---|
| Load (°C.) TRa-TIa TRb-TIb TRc-TIc | 0 + 0.5 | 1 ± 0.5 | 2 ± 0.5 | 3 ± 0.5 | 4 ± 0.5 | 5 ± 0.5 | 6 ± 0.5 | 7 ± 0.5 | 8 ± 0.5 | 9 ± 0.5 | 10 ± 0.5 | 11 ± 0.5 | 12 ± 0.5 |

What is claimed is:

1. A two-room type air-conditioning apparatus comprising:

an outdoor apparatus; and first and second indoor apparatuses respectively connected to said outdoor apparatus through corresponding first and second electric expansion valves respectively, in which refrigerant compressed by a compressor is condensed by respective first and second heat exchangers provided in said first and second indoor apparatuses or by an outdoor heat exchanger provided in said outdoor apparatus after said refrigerant is expanded to be decompressed by said first and second electric expansion valves respectively, said refrigerant is evaporated by said outdoor heat exchanger or said first and second indoor heat exchangers so as to perform an air-conditioning operation such as heating or cooling operations for respective areas, wherein opening/closing degrees of said electric expansion valves are determined by a ratio of the loads for said first and second indoor apparatuses, the loads being obtained from the differences between setting temperatures set by first and second room temperature setting means provided in said first and second indoor apparatuses respectively and actual room temperatures actually detected by first and second room temperature detecting means provided in the first and second indoor apparatuses respectively.

2. A two-room type air-conditioning apparatus comprising:

an outdoor apparatus; and first and second indoor apparatuses respectively connected to said outdoor apparatus through corresponding first and second electric expansion valves respectively, in which refrigerant compressed by a frequency variable type compressor is condensed by respective first and second indoor heat exchangers provided in said first and second indoor apparatuses or by an outdoor heat exchanger provided in said outdoor apparatus after said refrigerant is expanded to be decompressed by said first and second electric expansion valves respectively, said refrigerant is evaporated by said outdoor heat exchanger or said first and second indoor heat exchangers so as to perform an air-conditioning operation such as heating or cooling operations for respective areas, wherein the frequency of said compressor is calculated from a predetermined algorithmic expression for each of the cooling and heating operations with respect to the load factors in response to the loads of said first and second indoor apparatuses obtained by the differences between setting temperatures set by first and second room temperature setting means provided in said first and second indoor apparatuses and the actual room temperatures actually detected by first and second room temperature detecting means provided in the first and second indoor apparatuses respectively with respect to the ratio of the capacities of said first and second indoor apparatuses, and the ratio of opening/closing degrees of said first and second electric expansion valves is determined by the ratio of said load factors respectively.

3. The two-room air-conditioning apparatus according to claim 2, wherein said predetermined algorithmic expression for calculating the frequency of said compressor comprises:

the load factors of said first and second indoor apparatuses being a and b respectively, the ratio of the capacity of said first indoor apparatuses having the load factor b to the capacity of said second indoor apparatus having the load factor a being M, and the frequency F of said compressor being calculated from a first algorithmic expression in a cooling operation and the frequency F being calculated from a second algorithmic expression in a heating operation, wherein said first algorithmic expression is $$b = -\{M^2/(f \cdot F)\}a^2 + f \cdot F$$

and said second algorithmic expression is
$$b = -M \cdot a + f \cdot F$$

with f being a proportional constant.

4. A multi-room type air-conditioning apparatus comprising:

an outdoor apparatus; and a plurality of three or more indoor apparatuses respectively connected to said outdoor apparatus through a plurality of electric expansion valves respectively corresponding in number to said plurality of indoor apparatuses, in which refrigerant compressed by a frequency variable type compressor is condensed by an indoor heat exchanger provided in each of said plurality of indoor apparatuses or by an outdoor heat exchanger provided in said outdoor apparatus after said refrigerant is expanded to be decompressed by said plurality of electric expansion valves respectively, said refrigerant is evaporated by said outdoor heat exchanger or said respective indoor heat exchangers so as to perform an air-conditioning operation such as heating or cooling operations for respective, areas, wherein switch means is provided in said outdoor apparatus for detecting the number of said plurality of indoor apparatuses, and indoor apparatus rated capacity transmission means is respectively provided in each of said plurality of indoor apparatuses for transmitting serial signals of the rated capacities of said plurality of indoor apparatuses, whereby the frequency of said compressor is calculated from a predetermined algorithmic expression in each of the cooling and heating operations with respect to load factors based on the loads of said plurality of indoor apparatuses obtained by the differences between setting temperatures set by room temperature setting means provided in each of said plurality of indoor apparatuses and the actual room temperatures actually detected by room temperature detecting means provided in each of said plurality of indoor apparatuses with respect to the ratio of the sum of the capacities of said plurality of indoor apparatuses being divided into first and second groups, and the ratios of opening/closing degrees of said plurality of electric expansion valves are determined by the ratios of said load factors respectively.

5. The multi-room type air conditioning apparatus according to claim 4, wherein said predetermined algorithmic expression for calculating the frequency of said compressor comprises:

the number of said plurality of indoor apparatuses being n, the load factors of said plurality of indoor apparatuses being $a_1, a_2, \ldots, a_n$, of which the sum is divided into said first and second groups of $a = (a_1 + a_2 + \ldots + a_{n/2})$ and $b = [a_{(n/2+1)} + a_{(n/2+2)} + \ldots + a_n]$, the rated capacities of the plurality of indoor apparatuses being $Q_1, Q_2, \ldots, Q_n +$ the ratio of the sums of said first and second groups of the capacities $Q_1$ to $Q_{n/2}$ and $Q_{(n/2+1)}$ to $Q_n$ being N, wherein $$N = \{Q_{(n/2+1)} + Q_{(n/2+2)} + \ldots + Q_n\}/\{Q_1 + Q_2 + \ldots + Q_{n/2}\}$$

and the added numerals are integers of which the parts below the decimal are raised and when n is an odd, n is replaced by n+1, and the frequency F of said compressor being calculated from a first algorithmic expression in a cooling operation and a second algorithmic expression in a heating operation, wherein said first algorithmic expression is $$F = (b + \sqrt{b^2 + 4N^2 a^2})/2f$$

and said second algorithmic expression is $$F = (N a + b)/f$$

with f being a proportional constant.

* * * * *